United States Patent [19]

Euverard

[11] Patent Number: 4,738,131
[45] Date of Patent: Apr. 19, 1988

[54] GUARDED RING TENSIONED THICKNESS STANDARD

[75] Inventor: Maynard R. Euverard, Williamsburg, Va.

[73] Assignee: Paul N. Gardner Company, Inc., Pompano Beach, Fla.

[21] Appl. No.: 63,072

[22] Filed: Jun. 17, 1987

[51] Int. Cl.$^4$ .............................................. G01R 35/00
[52] U.S. Cl. .................................................... 73/1 J
[58] Field of Search ................... 73/1 J; 378/207, 58, 378/48; 324/202; 250/252.1

[56] References Cited

U.S. PATENT DOCUMENTS

| | | | |
|---|---|---|---|
| 4,150,288 | 4/1979 | Inoue et al. ............................ | 378/207 |
| 4,160,208 | 7/1979 | Steingroever et al. .............. | 324/202 |
| 4,567,436 | 1/1986 | Koch .................................... | 324/202 |
| 4,646,341 | 2/1987 | Finer et al. ........................... | 378/207 |

FOREIGN PATENT DOCUMENTS 0114825 7/1983 Japan ...................................... 29/447

Primary Examiner—Stewart J. Levy
Assistant Examiner—Robert R. Raevis
Attorney, Agent, or Firm—Burns, Doane, Swecker & Mathis

[57] ABSTRACT

A guarded ring tensioned thickness standard for use with coating thickness gages includes a ring formed of a first material having a coefficient of thermal expansion which is less than the coefficient of thermal expansion of a second material from which a diaphragm is formed. The diaphragm is bonded to the ring at a temperature which is elevated with respect to room temperature so that after the standard has cooled to room temperature, the diaphragm is supported in tension on the ring. The diaphragm is formed of a thickness corresponding to the estimated thickness of a coating to be measured and may be used both in the calibration of a coating thickness gage and in the actual measurement of uncured powdered coatings.

23 Claims, 2 Drawing Sheets

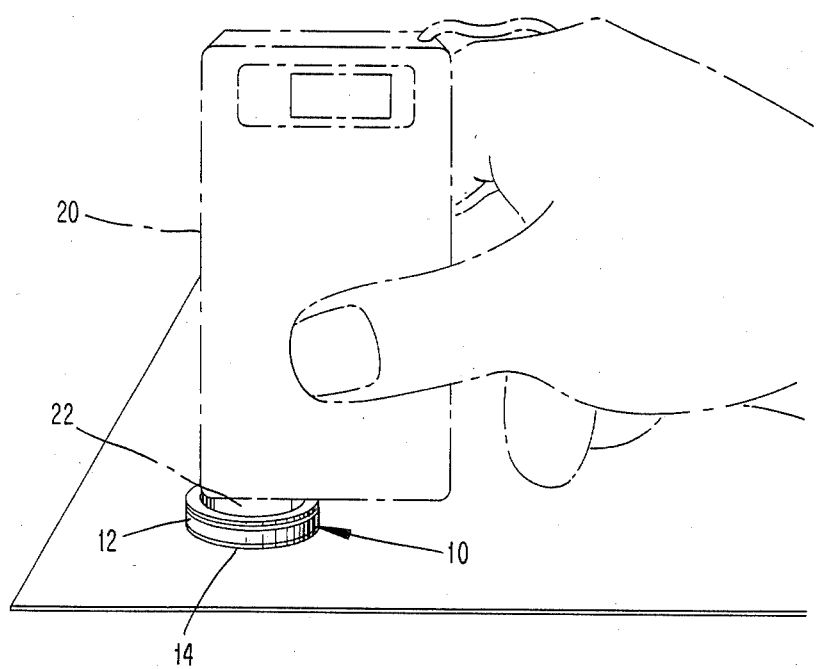

GUARDED RING TENSIONED THICKNESS STANDARD

BACKGROUND OF THE INVENTION

1. Field of the Invention

The present invention relates generally to thickness standards and, more particulary, to a thickness standard adapted for use with any of a number of known types of thickness gages.

2. Description of the Prior Art

Thickness gages are commonly used to measure the thickness of coatings such as paint, plating, galvanizing and anodic or organic coatings which have been applied to metallic or non-metallic surfaces such as steel, aluminum or graphite. Typically, these gages must be calibrated prior to use in a measuring operation. One method of carrying out such calibration is to place the gage against an uncoated surface and calibrate the gage to zero thickness. Alternatively, there are unmounted or unsupported films as well as films that have been applied to metallic base materials which are available and which are of a designated thickness and which may be placed beneath a gage during a calibration operation so as to provide a standard thickness by which the gage may be calibrated.

Several drawbacks exist with such known types of calibration. For example, it is not possible, absent the presence of some available standard, to accurately calibrate a gage to a desired precision prior to its use in measuring the thickness of a coating on a surface. In addition, it is desirable to actually calibrate the gage at the location in which the thickness of a coating is to be measured so as to insure that the gage is calibrated as accurately as possible and will not suffer from the effects of conditions related to a separate and remote standard surface which are different from the location of testing.

It is important in light of the fact that coating measurement may be in a very wide range of thickness, usually between 0.00050 and 0.01000 inches, that thickness gage calibration be with a thickness standard selected at a value that is close to the range of thickness to be expected in any particular application, in order to ensure most accurate readings from the thickness measuring instrument.

Conventional films which have been employed in the calibration of thickness measuring gages typically are unguarded, unmounted films which may be easily scratched, broken, warped or damaged so as to render any calibration made with the film to be unreliable. The useful life of such films is very short even if the films are properly stored when not in use.

In addition, there are some known thickness standards employing a film mounted on a relatively heavy supporting surface which may be placed at a position remote from the surface upon which a coating is to be measured. Gages may be placed against the film on the support surface and calibrated by the known thickness of the film. A drawback of this type of thickness standard is that since the surface supporting the standard thickness film is not the actual surface which is to receive a coating, the calibration may be inaccurate. For example, where a magnetic gage is employed, the magnetic characteristics of the surface supporting the standard thickness film may differ from the actual surface which is to be coated so that the calibration of the gage made on the film support surface may be inaccurate.

In addition to there being a need for a thickness standard which may be employed on the actual surface to be coated, there is a need for an apparatus which will permit a thickness gage to be employed in the measurement of uncured powdered material coatings on a surface. Presently, there are no devices available which would permit uncured powdered coatings to be measured at the surface to which they are applied. Such a capability would be advantageous since the thickness of the uncured coating is determinative of the thickness of the final cured coating.

OBJECTS AND SUMMARY OF THE INVENTION

An important object of the present invention is to provide a standard having a desirable thickness in a guarded ring which supports and protects the standard.

It is another object of the present invention to provide a guarded ring thickness standard capable of permitting the calibration of a coating thickness gage at a surface to be coated so as to ensure the accuracy of the calibration.

It is a further object of the invention to provide a tensioned thickness standard that permits a coating thickness gage to be used in the measurement of uncured powdered coatings.

Additionally, it is an object of the invention to provide a guarded ring tensioned thickness standard such that a diaphragm of known thickness is mounted in tension on a ring which protects the diaphragm from damage and maintains the tension of the diaphragm so as to prolong the life of the diaphragm and permit the use of the diaphragm in the measurement of powdered coatings and so as to protect the diaphragm from damage.

These objects and others are achieved by the present invention which relates to a thickness standard for use with any of a number of types of coating thickness gages and which includes a ring formed of a first material having a first coefficient of thermal expansion, a diaphragm formed of a second material having a second coefficient of thermal expansion which is higher than the first coefficient of thermal expansion, and means for bonding the diaphragm to an end of the ring at a temperature elevated with respect to a use temperature such as room temperature so that the diaphragm is held in tension by the ring at the use temperature.

The first and second materials may be constructed of any metallic or non-metallic materials depending on the type of gage with which the standard is to be employed so long as the coefficient of thermal expansion of the second material is greater than that of the first material.

The diaphragm preferably has a thickness of between 0.00050 to 0.01000 inches so that the thickness of the diaphragm roughly coincides with the estimated thickness of a coating to be measured. This ensures that the gage is calibrated accurately within the critical range to be measured.

The ring has a height of about 0.25 inches so as to provide sufficient support for the diaphragm while not interfering with the cooperation between the diaphragm and a gage to be calibrated.

BRIEF DESCRIPTION OF THE DRAWINGS

The preferred embodiment of the invention is discussed in the following detailed description which should be considered in connection with the figures in the accompanying drawing in which:

FIG. 5 is a perspective view of a guarded ring tensioned thickness standard in use with a coating thickness gage.

DETAILED DESCRIPTION OF THE PREFERRED EMBODIMENT

A preferred embodiment of the inventive thickness standard will be discussed with reference to FIGS. 1-4 after which will follow a discussion of the methods of use of the standard with known coating thickness gages.

Figure 1:
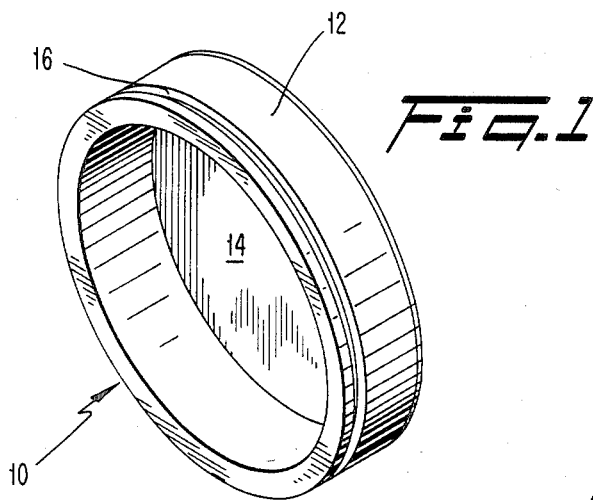
FIG. 1 is a perspective view of a guarded ring tensioned thickness standard according to the invention.

As illustrated in FIG. 1, a guarded ring tensioned thickness standard 10 constructed in accordance with the invention includes a rigid ring 12 formed of a first material having a first coefficient of thermal expansion and a diaphragm 14 formed of a second material having a second coefficient of thermal expansion. The coefficient of thermal expansion of the second material is chosen to be greater than the coefficient of thermal expansion of the first material. This ensures that when the diaphragm 14 is bonded to an axial end of the ring 12 at an elevated temperature, the diaphragm 14 will be supported in tension by the ring 12 after it has cooled to room temperature. This ensures that the diaphragm 14 is maintained in a perfectly flat orientation with respect to any surface against which the standard 10 is placed.

The choice as to what material is to be employed in the ring 12 and diaphragm 14 depends upon the type of gage which is to be used with the standard 10. For example, where an electrical or electronic type coating measuring gage is to be employed, such as one which would be influenced by an electrical conductive material, it is possible to use nonmetallic, non-electrical conductive materials, such as plastic, in either or both the ring 12 and diaphragm 14. Alternatively, where a magnetic type measuring gage is to be calibrated, it is possible to employ non-ferrous metallic materials which will not affect the accuracy of the calibration of the magnetic gage. Therefore, non-magnetic stainless steel or other non-ferrous, metallic materials such as brass or aluminum, are employed in the diaphragm 14 and/or ring 12 to ensure the required accuracy.

It should be noted that the choice as to materials which may be used in the ring 12 and diaphragm 14 is not restricted in any way other than that it is necessary that the diaphragm 14 be connectable to the ring 12 so as to be tensioned at all times. In the preferred embodiment of the invention, this requirement is satisfied by providing that the material of the diaphragm 14 has a coefficient of thermal expansion which is higher than the coefficient of thermal expansion of the material used in the ring 12, and by bonding the diaphragm 14 to the ring 12 when at least the diaphragm 14 is at an elevated temperature so that the diaphragm 14 will shrink relative to the ring 12 as the temperature of at least the diaphragm 14 returns to normal use temperature. Therefore, the material of the diaphragm 14 could be, e.g. polyimide while the material of the ring 12 was some metallic material having a coefficient of thermal expansion which is less than that of the polyimide used in the diaphragm 14.

However, it is also possible to make the ring and diaphragm from the same material or from different materials having the same coefficient of thermal expansion by heating only the diaphragm and bonding the heated diaphragm to a ring which is at a typical use temperature so that the diaphragm is supported in tension by the ring once the temperature of the diaphragm has returned to the use temperature.

Figure 2:
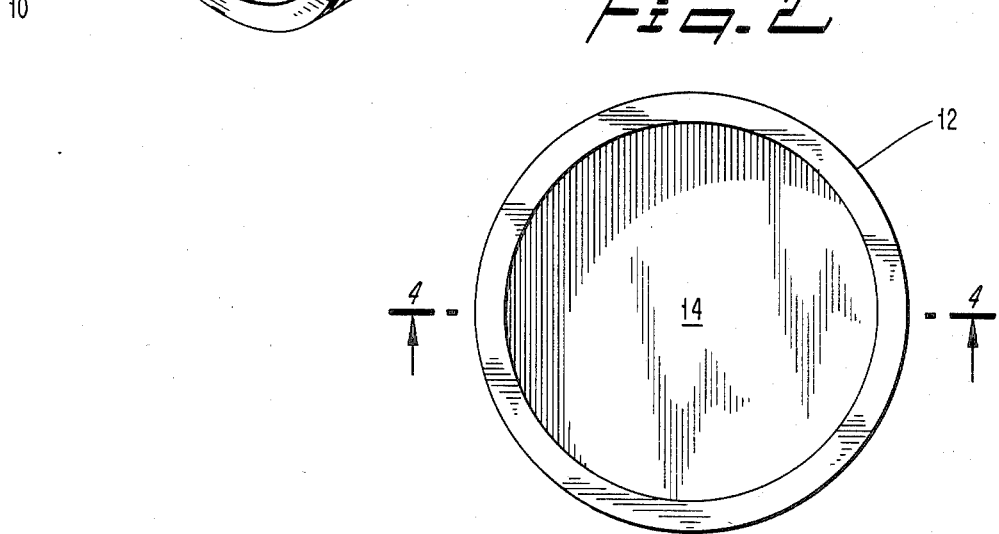
FIG. 2 is a top view of the standard shown in FIG. 1.

The ring 12 is a hollow ring as illustrated in FIG. 2 and has a diameter which accommodates any gage or gage probe which is to be used with the standard 10. The ring 12 has a thickness in the radial direction which is sufficient to support the diaphragm 14 without a danger of the diaphragm 14 and ring 12 becoming warped. The diameter of the ring 12 is chosen to be as small as possible so as to provide the maximum amount of protection to the diaphragm 14 as possible.

Figure 3:
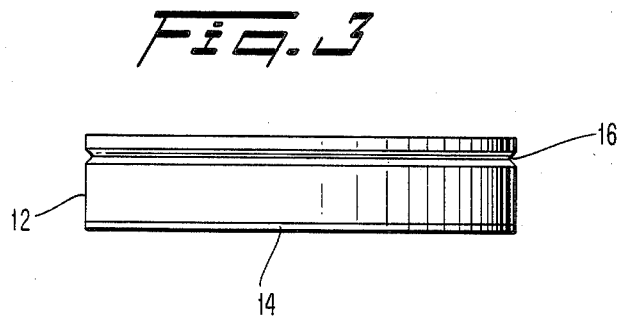
FIG. 3 is a side view of the standard of FIG. 1.

The ring 12 may be provided with means for gripping the standard such as a groove 16 shown in FIG. 3. This groove 16 is provided at an axial end of the ring 12 opposite the diaphragm 14 so that when the standard 10 is being used as a means for permitting the measurement of powdered coatings, the ring 12 can be handled without a danger of the person handling the standard 10 disturbing the coating. The use of such gripping means also facilitates the general handling of the standard 10.

Figure 4:
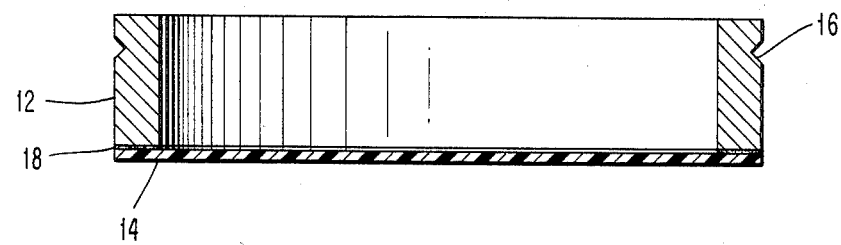
FIG. 4 is a side section view of the guarded ring tensioned thickness standard of FIG. 1 taken along line 4—4 of FIG. 2.

The bonding material 18 is shown in FIG. 4 and may consist of any suitable material which effectively bonds the first and second materials together in such a manner that the tension of the diaphragm 14 may be maintained after the bonding has occurred.

The diaphragm 14 has a thickness which is preferably in the range of the thickness of the coating to be measured. In the preferred embodiment, this thickness is in the range of 0.00050 to 0.01000 inches. By selecting the diaphragm 14 based on this consideration, the gage may be calibrated at a value near the actual value to be measured. This ensures that any discrepancies related to the scale of the gage will not interfere with the accuracy of the measurement of the coating thickness.

Two methods of using the standard 10 will now be discussed with reference to FIG. 5.

A first use for the above-described thickness standard is in the calibration of coating thickness gages. The method of using the standard in such a calibration process is as follows. First, the diaphragm 10 is cleaned and the standard is placed with the diaphragm 14 down against a clean and smooth portion of the support material which is representative of the type and thickness that will receive the coating to be evaluated. The measuring sensor 22 of the coating thickness measuring gage 20, shown in phantom lines in FIG. 5, is then placed inside the ring 12 and a measurement is taken of the standard 10. If the thickness recorded by the gage 20 differs from the value known to be the thickness of the diaphragm 10, the gage 20 is adjusted and the procedure repeated until compliance is obtained.

In this manner, the gage 20 may be calibrated at a surface which is similar if not identical to the actual surface which is to receive the coating to be measured. This ensures that the gage 20 is properly calibrated in accordance with the conditions in existence at the location of measurement.

In addition, since the diaphragm 10 is of a thickness close to the estimated thickness of the coating, increased accuracy of the measurement of the coating thickness is ensured.

The second method of using the inventive standard is in the measurement of powdered coatings which have been applied to a surface but have not yet been cured.

When used in this type of measurement process, the standard 10 is first cleaned and placed gently on the surface of the powdered coating to be measured, so as not to disturb the applied coating. Thereafter, the sensor 22 of a thickness gage 20 which has been properly calibrated is placed inside the standard 10 and the combined thickness of the diaphragm 14 and the coating is measured. The known thickness of the diaphragm 14 is then subtracted from the obtained reading and the result is the thickness of the applied coating.

Thus, it is possible to determine the thickness of a powdered coating before the coating is cured. This permits the coating thickness to be increased or decreased prior to the curing operation in response to the measurement and in accordance with a desired coating thickness.

Due to the above-described affect that different materials and different diaphragm thicknesses may have upon the accuracy of calibration of different types of coating thickness gages, it is preferred that a variety of standards be produced and made available in sets so that proper calibration of all types of gages is ensured.

While this invention has been illustrated and described in accordance with a preferred embodiment, it is recognized that variations and changes may be made and equivalents employed herein without departing from the invention as set forth in the claims.

What is claimed is:

1. A thickness standard for use with any of a number of types of coating thickness gages comprising:
    a rigid ring formed of a first material having a first coefficient of thermal expansion,
    a diaphragm formed of a second material having a second coefficient of thermal expansion which is at least as high as said first coefficient of thermal expansion, and
    means for bonding said diaphragm to an end of said ring with said diaphragm being at a temperature elevated with respect to a use temperature of said ring so that said diaphragm is held in tension by said ring at the use temperature, whereby the standard is adapted either to be placed with the diaphragm down against a support material which is representative of the type that will receive the coating to be evaluated, or to be placed on a surface of a coating to be measured.

2. The thickness standard according to claim 1 wherein said first material is metallic.

3. The thickness standard according to claim 2 wherein said first material is non-magnetic stainless steel.

4. The thickness standard according to claim 2 wherein said second material is metallic.

5. The thickness standard according to claim 2 wherein said second material is non-metallic.

6. The thickness standard according to claim 1 wherein said first material is non-metallic.

7. The thickness standard according to claim 6 wherein said second material is non-metallic.

8. The thickness standard according to claim 7 wherein said second material is polyimide.

9. The thickness standard according to claim 6 wherein said second material is metallic.

10. The thickness standard according to claim 1 wherein said diaphragm has a thickness of between 0.00050 and 0.01000 inches.

11. The thickness standard according to claim 1 wherein said ring has a ring height in an axial direction of the ring which is approximately 0.25 inches.

12. A thickness standard for use with any of a number of types of coating thickness gages comprising:
    a rigid ring formed of a first material having a first coefficient of thermal expansion,
    a diaphragm formed of a second material having a second coefficient of thermal expansion which is higher than said first coefficient of thermal expansion, and
    means for bonding said diaphragm to an end of said ring at a temperature elevated with respect to a use temperature so that said diaphragm is held in tension by said ring at the use temperature, whereby the standard is adapted either to be placed with the diaphragm down against a support material which is representative of the type that will receive the coating to be evaluated, or to be placed on a surface of a coating to be measured.

13. The thickness standard according to claim 12 wherein said first material is metallic.

14. The thickness standard according to claim 13 wherein said first material is non-magnetic stainless steel.

15. The thickness standard according to claim 13 wherein said second material is metallic.

16. The thickness standard according to claim 13 wherein said second material is non-metallic.

17. The thickness standard according to claim 12 wherein said first material is non-metallic.

18. The thickness standard according to claim 17 wherein said second material is non-metallic.

19. The thickness standard according to claim 18 wherein said second material is polyimide.

20. The thickness standard according to claim 17 wherein said second material is metallic.

21. The thickness standard according to claim 12 wherein said diaphragm has a thickness of 0.00050 to 0.01000 inches.

22. The thickness standard according to claim 12 wherein said ring has a ring height in an axial direction of the ring which is approximately 0.25 inches.

23. A method of constructing a guarded ring tensioned thickness standard comprising the steps of:
    forming a rigid ring from a first material having a first coefficient of thermal expansion,
    forming a diaphragm from a second material having a second coefficient of thermal expansion which is at least as high as said first coefficient of thermal expansion,
    heating said diaphragm to a temperature which is high relative to a normal use temperature, and
    bonding said diaphragm to an axial end of said ring so that the diaphragm is supported in tension on the ring after the diaphragm has cooled to the use temperature, whereby the standard is adapted either to be placed with the diaphragm down against a support material which is representative of the type that will receive the coating to be evaluated, or to be placed on a surface of a coating to be measured.

* * * * *